(12) United States Patent
Fairy

(10) Patent No.: US 7,544,056 B2
(45) Date of Patent: Jun. 9, 2009

(54) VALVE-GATED INJECTION MOLDING NOZZLE HAVING AN ANNULAR FLOW

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 207 days.

(21) Appl. No.: 11/609,152

(22) Filed: Dec. 11, 2006

(65) Prior Publication Data

US 2007/0082083 A1    Apr. 12, 2007

Related U.S. Application Data

(63) Continuation-in-part of application No. 11/142,915, filed on Jun. 2, 2005, now Pat. No. 7,364,425.

(60) Provisional application No. 60/575,842, filed on Jun. 2, 2004.

(51) Int. Cl.
*B29C 45/23* (2006.01)

(52) U.S. Cl. .................................. 425/564; 425/566

(58) Field of Classification Search ................ 425/549, 425/572, 562, 563, 564, 565, 566
See application file for complete search history.

(56) References Cited

U.S. PATENT DOCUMENTS

| | | |
|---|---|---|
| 3,915,358 A | 10/1975 | Hehl |
| 4,212,625 A | 7/1980 | Shutt |
| 4,303,382 A | 12/1981 | Gellart |
| 4,501,550 A | 2/1985 | Nikkuni |
| 4,711,602 A | 12/1987 | Baker |
| 4,712,990 A | 12/1987 | Kudert et al. |
| 4,781,572 A | 11/1988 | Boring |
| 4,787,836 A | 11/1988 | Osuna-Diaz et al. |
| 4,965,028 A | 10/1990 | Maus et al. |
| 5,208,052 A | 5/1993 | Schmidt et al. |

(Continued)

FOREIGN PATENT DOCUMENTS

DE    196 08 676 C1    1/1997

(Continued)

OTHER PUBLICATIONS

HASCO, "Duese versuche Fur Z3310/25".

(Continued)

*Primary Examiner*—Tim Heitbrink
(74) *Attorney, Agent, or Firm*—Medler Ferro PLLC

(57) ABSTRACT

A valve-gated nozzle for an injection molding machine includes an annular flow channel between downstream portions of a nozzle liner and a sealing and/or retaining device. The nozzle liner includes a first melt channel and one or more second melt channels for communicating a melt stream to the annular melt channel. The annular melt channel is formed between an inner surface of the downstream portion of the sealing and/or retaining device and an outer surface of the downstream portion of the nozzle liner. The annular melt channel may include a groove within at least one of the inner surface of the sealing/retaining device and the outer surface of the nozzle liner, such that the groove is in communication with an outlet of the second melt channel to thereby guide and/or blend the molten material within the annular melt channel to even and balance flow into a mold cavity.

32 Claims, 11 Drawing Sheets

U.S. PATENT DOCUMENTS

| | | |
|---|---|---|
| 5,324,191 A | 6/1994 | Schmidt |
| 5,513,976 A | 5/1996 | McGrevy |
| 5,545,028 A | 8/1996 | Hume et al. |
| 5,716,651 A | 2/1998 | McGrevy |
| 5,840,231 A | 11/1998 | Teng |
| 5,871,786 A | 2/1999 | Hume et al. |
| 5,879,727 A | 3/1999 | Puri |
| 5,948,450 A | 9/1999 | Swenson et al. |
| 6,022,210 A | 2/2000 | Gunther |
| 6,089,468 A | 7/2000 | Bouti |
| 6,245,278 B1 | 6/2001 | Lausenhammer et al. |
| 6,273,706 B1 | 8/2001 | Gunther |
| 6,302,680 B1 | 10/2001 | Gellert et al. |
| 6,305,923 B1 | 10/2001 | Godwin et al. |
| 6,349,886 B1 | 2/2002 | Bouti |
| 6,478,567 B1 | 11/2002 | Kushnir et al. |
| 6,524,093 B2 | 2/2003 | Bouti |
| 6,609,902 B1 | 8/2003 | Blais et al. |
| 6,679,697 B2 | 1/2004 | Bouti |
| 6,769,901 B2 | 8/2004 | Babin et al. |
| 6,832,909 B2 | 12/2004 | Bazzo et al. |
| 7,344,372 B2 * | 3/2008 | Fairy ............... 425/549 |
| 7,364,425 B2 * | 4/2008 | Fairy ............... 425/564 |
| 2002/0081348 A1 | 6/2002 | Bouti |
| 2003/0209833 A1* | 11/2003 | Bemis et al. ............ 425/133.1 |
| 2004/0022891 A1 | 2/2004 | Sicilia et al. |
| 2004/0091562 A1 | 5/2004 | Pilavdzic et al. |
| 2004/0234646 A1 | 11/2004 | Benenati |
| 2005/0140061 A1 | 6/2005 | Puniello et al. |
| 2005/0175732 A1 | 8/2005 | Saito et al. |
| 2005/0271766 A1 | 12/2005 | Fairy |
| 2006/0018993 A1 | 1/2006 | Fairy |

FOREIGN PATENT DOCUMENTS

| | | |
|---|---|---|
| DE | 195 33 231 A1 | 3/1997 |
| DE | 19730380 | 1/1999 |
| DE | 100 08 722 A1 | 8/2001 |
| DE | 10 2004 032 336 B3 | 11/2005 |
| EP | 0 546 554 | 3/1997 |
| EP | 1295693 | 3/2003 |
| JP | 04-320820 A | 11/1992 |
| JP | 2000-167883 A | 6/2000 |
| WO | WO 03/028974 A | 4/2003 |
| WO | WO 2005/090051 A1 | 9/2005 |
| WO | WO-2006/123237 | 11/2006 |

OTHER PUBLICATIONS

HASCO, "Duese versuche Fur Z3310/25", NVD Bypass Drawings.
"Ewikon Brochure", (Oct. 2000).
"HASCO Z1081/Magnetic Needle Valve Brochure", (Nov. 2005).
Wright, Corin, "Improving color change in hot runner molds", *Plastics Machinery & Auxiliaries* (Apr. 2003), p. 16-17.

* cited by examiner

SECTION D-D

VALVE-GATED INJECTION MOLDING NOZZLE HAVING AN ANNULAR FLOW

CROSS REFERENCE TO RELATED APPLICATIONS

This application is a continuation-in-part of prior application Ser. No. 11/142,915, filed Jun. 2, 2005 that issued as U.S. Pat. No. 7,364,425 on Apr. 29, 2008, which claims the benefit of U.S. Provisional Application No. 60/575,842, filed Jun. 2, 2004, which are incorporated by reference herein in their entireties.

This application is related to U.S. application Ser. No. 11/065,167, filed Feb. 24, 2005 that issued as U.S. Pat. No. 7,344,372 on Mar. 18, 2008, which claims the benefit of U.S. Provisional Application No. 60/575,841, filed Jun. 2, 2004, which are incorporated by reference herein in their entireties.

BACKGROUND OF THE INVENTION

1. Field of the Invention

The present invention is related to a nozzle for an injection molding apparatus.

2. Related Art

Injection molding systems generally include an injection molding unit, an injection manifold and one or more hot runner nozzles for receiving melt from the manifold and transferring/distributing the melt to one or more mold cavities. Hot runner systems offer the choice between thermal gating and valve gating. Valve gating is used in applications where the esthetic appearance of finished molded part is important, because it provides a better gate vestige on the part than thermal gating. One problem with valve pin gating is premature wear of the pin and the nozzle as a result of misalignment of the valve pin; this in turn may cause leakage and poor cosmetic part quality.

Certain known valve-gated hot runner nozzles are not suitable for molding parts that require improved strength or higher esthetic merits. This is because the valve pin behaves as an obstruction in the flow of the melt through the nozzle and towards the mold cavity. The valve pin splits the melt flow and this creates undesirable flow lines that are visible or weakens the finished molded part. In order to utilize a runner system to make injection molded parts of various colors, a first color molten material must be flushed from the system so that a second color molten material may be run through the injection molding machine to produce parts of different color. Residue material from the first/subsequent color of the molten material conventionally causes numerous shots of injection molded products to be defective because they have an undesirable blend of two colors of molten material. It is common for a substantial number of products to be defective in this way requiring multiple injection cycles to clear the runner system before useable products are formed.

Additionally or aside from when color change may be a problem, unidirectional molecular orientation and weld/flow lines can be a potential cause for weakness in the structural integrity, dimensional accuracy, or cause unwanted birefringence of molded products.

Therefore, what is needed is a system and method that substantially reduces residue of molten material in an injection molding machine, while also providing a method that improves valve pin alignment in the nozzle and gate area. Additionally or alternatively what is needed is a system and method for eliminating or substantially reducing unidirectional molecular orientation and/or weld/flow lines in a molded product caused by the valve gating device, such as a valve pin.

BRIEF SUMMARY OF THE INVENTION

An embodiment according to the present invention includes a valve-gated nozzle for an injection molding apparatus. The nozzle has a nozzle body with a nozzle melt channel and a nozzle liner having a first melt channel in fluid communication with the nozzle melt channel. The nozzle liner includes two or more second melt channels in fluid communication with the first melt channel, such that each second melt channel has a second melt channel axis that is at an angle with respect to a longitudinal axis of the first melt channel. The nozzle liner also includes a downstream portion that extends from proximate the outlets of the second melt channels to a downstream end of the nozzle liner. A retaining device secures the nozzle liner with respect to the nozzle body and includes a downstream portion with an inner surface, such that an annular melt channel is formed between the outer surface of the nozzle liner downstream portion and the inner surface of the retaining device downstream portion. In an embodiment, at least one of the outer surface of the nozzle liner downstream portion and the inner surface of the retaining device downstream portion includes a groove. The nozzle has a valve pin that slidingly extends within the nozzle melt channel and the first melt channel of the nozzle liner to selectively open a mold gate, wherein the downstream portion of the nozzle liner has a valve pin alignment bore for aligning the valve pin with the mold gate.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the pertinent art to make and use the invention.

DETAILED DESCRIPTION OF INVENTION

Figure 1:
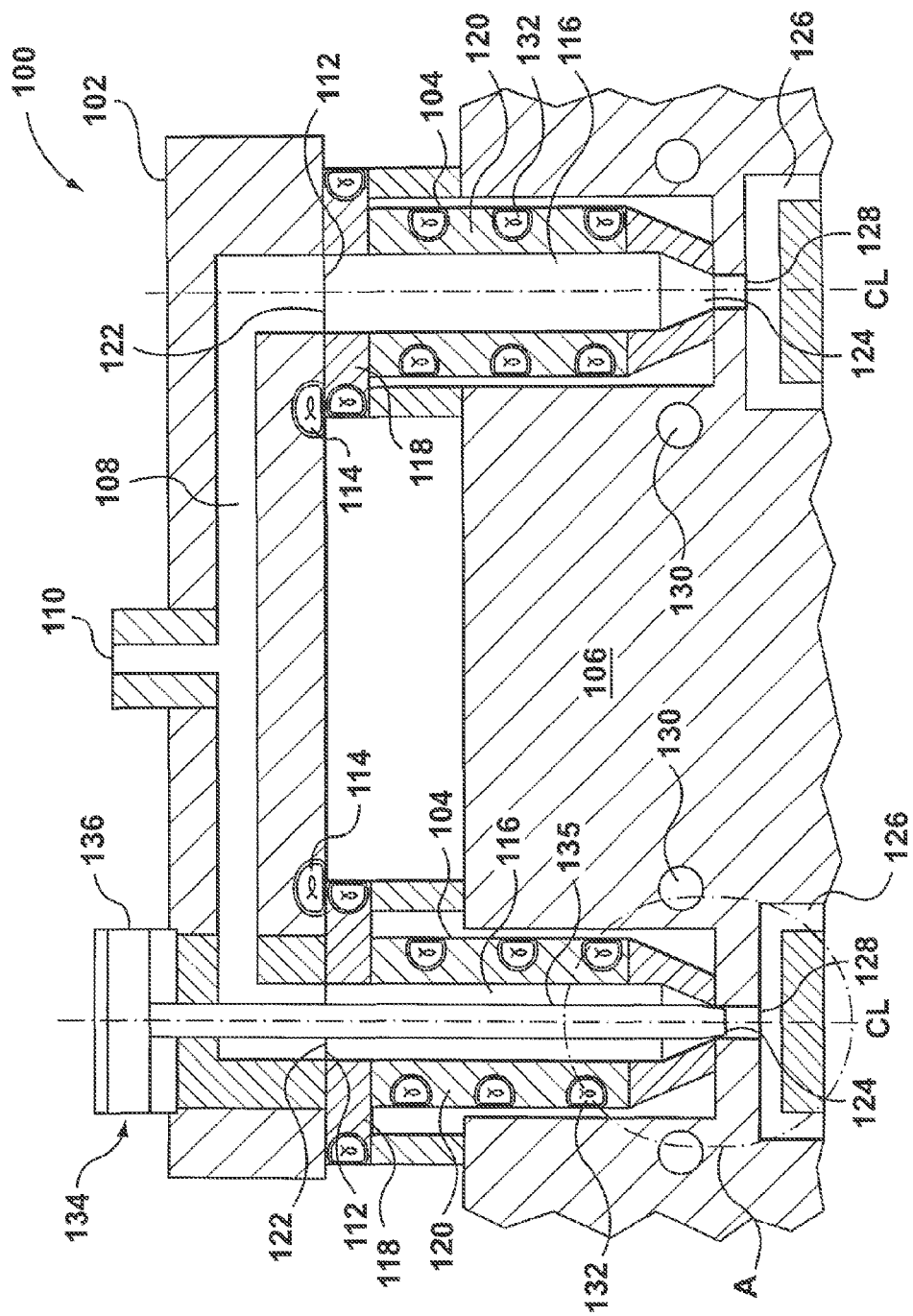
FIG. 1 illustrates a sectional view of an injection molding system in which the present invention may be utilized.

Specific embodiments of the present invention are now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments according to the present invention provide a valve-gated nozzle in an injection molding machine that allows for an improved flow of a molten material into a mold cavity, which can substantially reduce or eliminate flow lines in an injected molded product. In one example, this is accomplished through use of a valve-gated nozzle having a nozzle body with a nozzle melt channel in fluid communication with a nozzle liner, and which can also be in fluid communication with a manifold melt channel. The nozzle liner includes a first melt channel in fluid communication with the nozzle melt channel and one or more release melt channels between the first melt channel and an annular melt channel.

In an embodiment according to the present invention, the annular melt channel is formed between a retaining device and the nozzle liner. The annular melt channel includes a decompression chamber in fluid communication with respective ones of the release melt channels and a compression chamber between the decompression chamber and a mold cavity. In this embodiment, a pressure difference results between the respective release melt channels and the decompression chamber and between the decompression chamber and the compression chamber that acts to blend the molten material in the nozzle liner area more quickly and efficiently than current systems, such that it enters a mold cavity without flow lines, i.e., weld lines.

In an embodiment, the material used for the nozzle liner is a high thermally conductive material. In an embodiment, the nozzle liner has corrosion and abrasion resistance, e.g. wear resistance. A plurality of exit holes or bores, i.e., release or second tip melt channels, are located at a point where an outer surface of the nozzle liner separates from an inner surface of the retaining device. The exit holes or bores are oriented from the first tip melt channel outwardly towards the retaining device. The flow rate required from the hot runner system to fill the mold cavity is used to determine the diameter and the number of the exit holes.

As discussed above, an outer or exterior surface of the nozzle liner is designed in conjunction with an inner or interior surface of the retaining device to have the annular melt channel therebetween, with some embodiments including decompression and compression chambers. The nozzle liner exit holes or bores open to the decompression chamber, which creates a circular flow of the molten material around the nozzle liner in order to mix/blend the molten material. Then, under the growing pressure of the molten material in the decompression chamber, the molten material flows through the compression chamber, which acts as a pressure regulator and shear generator. This leads to an annular flow, which flushes out and further blends the molten material to eliminate flow lines and/or ease color change.

The compression of the molten material occurs up to a seal area at a downstream portion of the retaining device and a mold gate area. As such, in the seal area a reduction of the annular surface of the nozzle liner increases the flow speed and shear rate of the melt, which can result in an increase of the relative temperature of the molten material and hot runner components, e.g., the retaining device and the nozzle liner. This facilitates the re-melting and flushing out of any solidified melt material in contact with the mold left behind from the previous shot, which reduces the number of shots required to achieve complete color change.

In an embodiment, the nozzle liner may act as a guide for the valve pin in order to avoid any deflection due to pin closing and/or pressure against movement of the valve pin. By improving the valve pin alignment, less wear of the pin, nozzle, and gate area will occur, which results in better part quality and less chance of leakage.

FIG. 1 illustrates an injection molding apparatus 100 in which the present invention may be utilized. Apparatus 100 includes a manifold 102, a plurality of nozzles 104, and a mold plate 106. Manifold 102 has a plurality of manifold melt channels 108 extending therethrough from an inlet 110 to a plurality of outlets 112. Manifold 102 includes a heater 114 for heating melt in the manifold melt channels 108.

A nozzle melt channel 116 passes through a head portion 118 and a body portion 120 of nozzle 114, extending from an inlet 122 in head portion 118 to an outlet 124 in body portion 120. Head portion 118 abuts against a downstream surface of manifold 102 so that one of manifold melt channel outlets 112 communicates with inlet 122 of nozzle melt channel 116. Nozzle melt channel 116 may be generally longitudinally centered in head and body portions 118 and 120, i.e., melt channel 116 may extend generally along axis CL. Each nozzle 104 includes a heater 132 that is wrapped around body portion 120.

Mold plate 106 includes a plurality of mold cavities 126 in which injection molded articles are formed. Each mold cavity 126 receives melt through a gate 128, which is in communication with outlet 124 from one of nozzles 104. Mold plate 106 may be cooled by means of a fluid flowing through a plurality of cooling channels 130, to solidify melt in mold cavities 126, thereby forming molded articles (not shown).

By example in FIG. 1, one of nozzles 104 includes a valve gating element 134. Valve gating element 134 includes a valve pin 135 that is movable within nozzle melt channel 116 by means of an actuator 136. The other one of nozzles 104 is thermally gated, and thus does not include a valve pin.

In use, melt passes from a melt source (not shown), through manifold inlet 110, through manifold melt channels 108, through nozzle melt channels 116, through gate 128 and into mold cavities 126.

It will be appreciated that nozzles 104 may be used with configurations of injection molding apparatus other than that shown in FIG. 1. For example, nozzles 104 may be used with injection molding apparatuses having a single mold cavity. Nozzles 104 may also be used with co-injection molding apparatuses that have a plurality of manifolds 102. Nozzles 104 may also be used in stack-mold machines.

FIGS. A 2 and 2A illustrate a side sectional view of a portion A of the valve-gated nozzle of FIG. 1 in accordance with embodiments of the present invention and show a valve pin 235 in both its open (right half) and closed (left half) positions. Valve-gated nozzle 204 includes a torpedo-type nozzle tip or liner 240. Nozzle 204 also includes a retaining device 242. In an embodiment, nozzle liner 240 and retaining device 242 may function as a two-piece nozzle seal. Retaining device 242 positions and secures nozzle liner 240 within a nozzle body 220. In this embodiment, retaining device 242 is engaged through threads on an outer wall 244 of retaining device 242 with complementary threads on an inner wall 246 of nozzle body 220. When engaged, a shoulder 248 of retaining device 242 abuts a curved portion 250 of nozzle liner 240 to secure it to nozzle body 220. In alternate embodiments, retaining device 242 may be engaged with nozzle body 220 by brazing, soldering, press fit, or any other acceptable known method.

Nozzle liner 240 transports or directs the melt from nozzle body melt channel 216 to mold cavity 226. As such, nozzle liner 240 may be made from a thermally conductive material to reduce losses in the heat transferred from nozzle heater 132 to the melt within the nozzle liner first and second melt channels 252, 254. Some examples of suitable thermally conductive materials for forming nozzle liner 240 include: Be—Cu(Beryllium-Copper), Beryllium-free Copper, such as AMPCO 940, TZM (Titanium/Zirconium carbide), Aluminum or Aluminum-based alloys, Nickel-Chromium alloys, such as INCONEL, Molybdenum or suitable Molybdenum alloys, H13, mold steel or steel alloys, such as AERMET 100.

In addition, the melt flow through and around nozzle liner 240 may expose the tip to a highly abrasive environment. Therefore, nozzle liner 240 may be made from a wear resistant material. A material that is both thermally conductive and wear resistant is tungsten carbide. The construction of a nozzle tip from tungsten carbide is disclosed in U.S. Pat. No. 5,658,604 to Gellert et al., which is incorporated by reference herein in its entirety.

In an embodiment, retaining device 242 may be made from a material that is less wear resistant than the material of nozzle liner 240, because retaining device 242 may not have as much contact with an abrasive melt as a nozzle liner with an internal melt passage. Accordingly, retaining device 242 may be made from a material that is relatively easily machined for readily forming the threaded portion thereon. In another embodiment, such as certain applications with highly abrasive melt, it may be beneficial for retaining device 242 to be of a wear resistant material due to melt contact made with an inner surface of retaining device 242 within an annular melt channel 256, which is described in more detail below.

Figure 2:
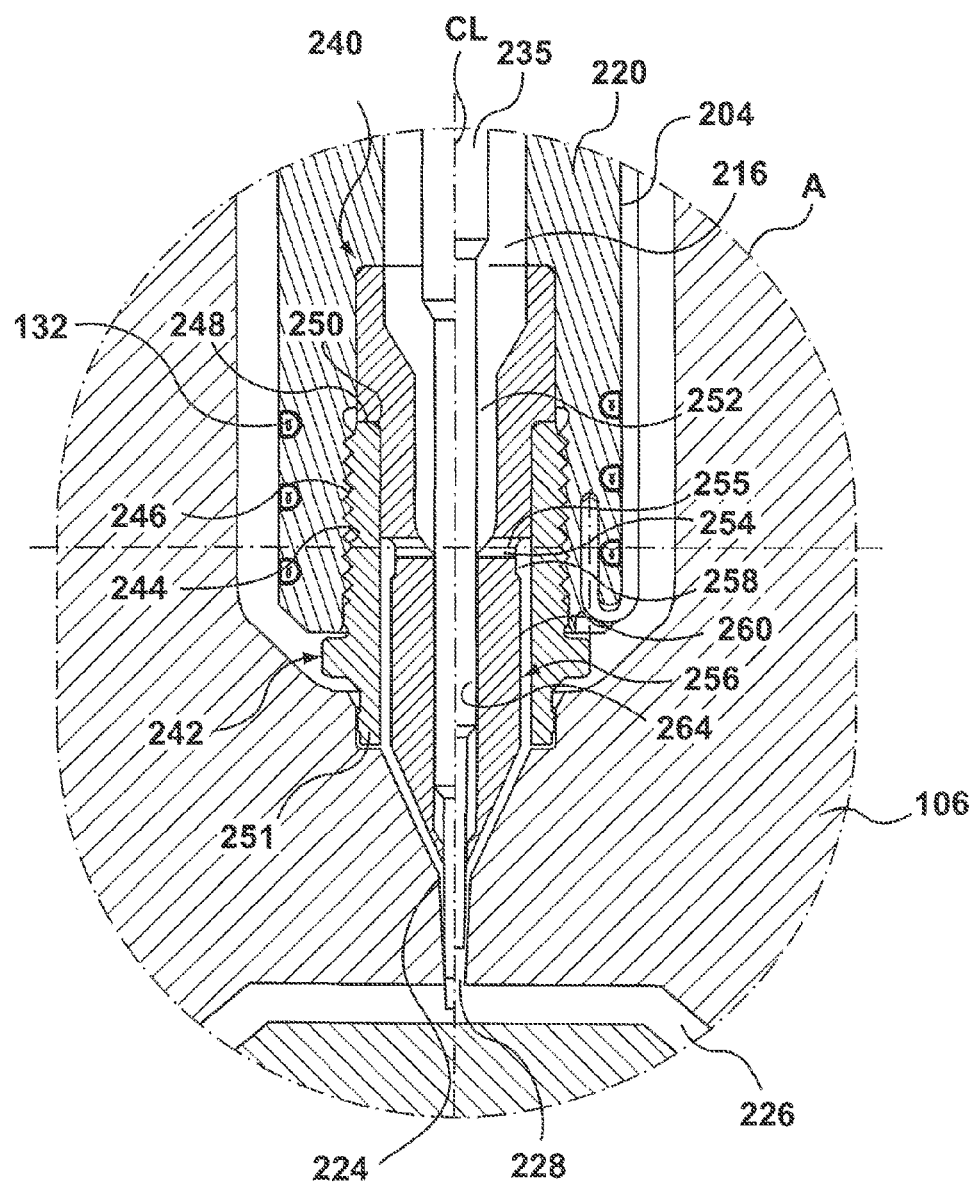
FIG. 2 illustrates a side sectional view of a portion A of FIG. 1 according to an embodiment of the present invention.

Retaining device 242 may be made from a steel-based, a titanium-based, a ceramic-based, or other thermally insulative material to prevent heat transfer away from the melt channels. In FIG. 2, retaining device 242 includes a sealing portion 251 that seals the air space around nozzle 204 to prevent melt from leaving the gate area. As sealing portion 251 contacts mold cavity plate 106, in another embodiment sealing portion 251 may function as an insulating insert or insulating portion, and only sealing portion 251 may be made from a thermally insulative material, such as, titanium, a ceramic, a heat resistant polymer, such as, certain polyimides, e.g. VESPEL, and/or polyketones, e.g., polyetheretherketone (PEEK), or the like with the remainder of retaining device 242 being made of a thermally conductive material, as discussed further below.

Retaining device 242 is at least in part, positioned between nozzle liner along at least a portion of the length of the first and second melt channels 252, 254 and nozzle heater 132. As such, in some embodiments, heat flow from nozzle heater 132 to first and second melt channels 252, 254 may be improved when retaining device 242 is made from a thermally conductive material. In another embodiment, retaining device 242 may be made from a thermally conductive material, such as, Copper, Be—Cu (Beryllium-Copper), Beryllium-free Copper, such as, AMPCO 940, TZM (Titanium/Zirconium carbide), Aluminum or Aluminum-based alloys, Nickel-Chromium alloys, such as INCONEL, Molybdenum or suitable Molybdenum alloys, H13, steel, mold steel or steel alloys, such as AERMET 100.

Figure 2A:
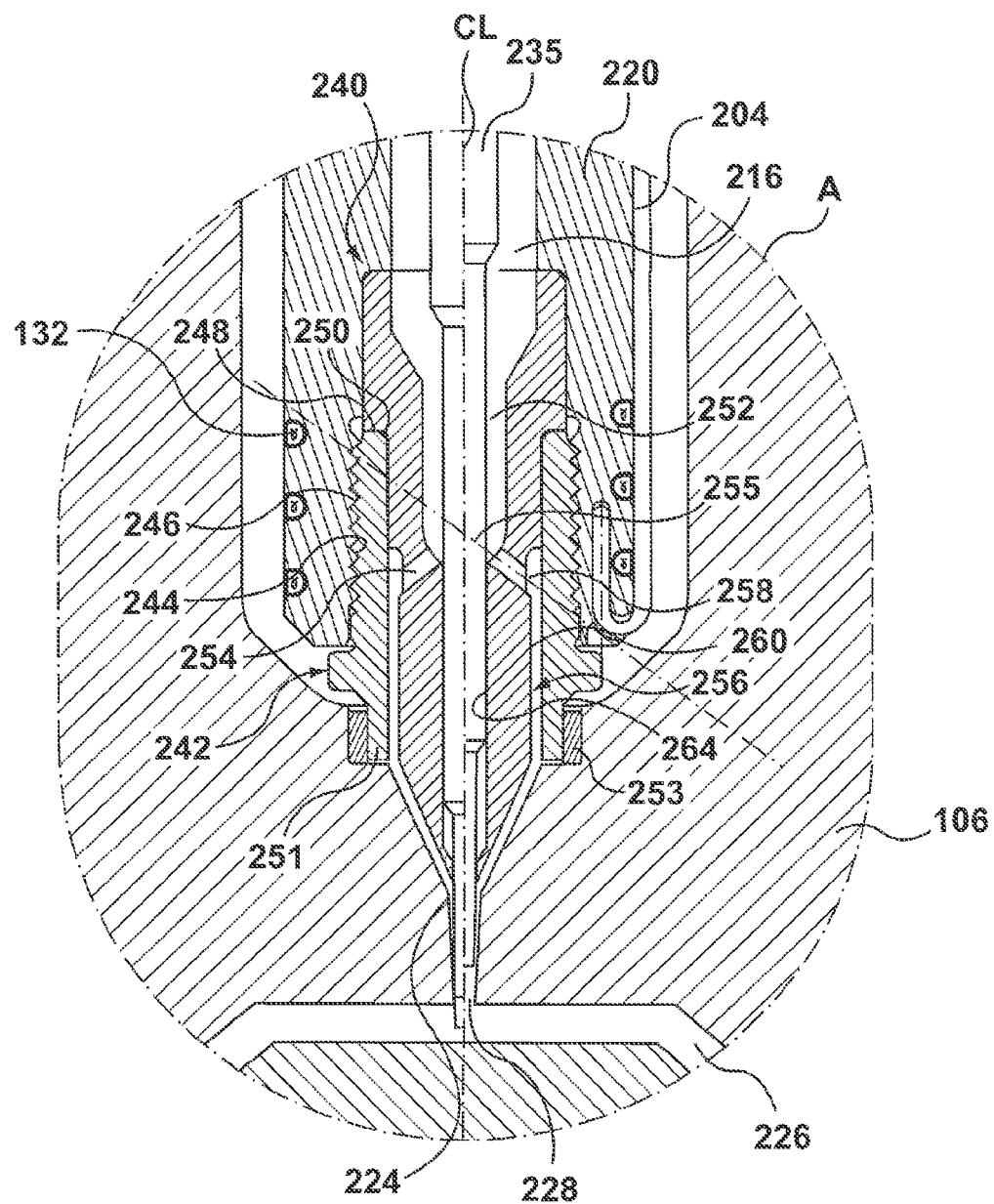
FIG. 2A illustrates a side sectional view of a portion A of FIG. 1 according to another embodiment of the present invention.

FIG. 2A illustrates a mold contacting piece or insulative insert 253 positioned between retaining device 242 and mold plate 106 that may inhibit melt leakage and heat transfer from the gate area. Mold contacting piece 253 may form a seal between retaining device 242 and mold plate 106, as well as aid in aligning nozzle 204 with respect to the gate 228.

In order to reduce unwanted heat transfer between nozzle liner 240, retaining device 242 and mold plate 106, mold contacting piece 253 may be made from a material that is comparatively less thermally conductive than the material of nozzle liner 240 and/or retaining device 242. For example, mold contacting piece 253 may be made from titanium, H13, stainless steel, mold steel, chrome steel, and certain ceramics and heat resistant polymers, such as, certain polyimides, e.g. VESPEL, and/or polyketones, e.g., polyetheretherketone (PEEK).

Nozzle liner 240 includes a first melt channel 252 having a longitudinal axis CL that is in fluid communication at an upstream end with a nozzle body melt channel 216. First melt channel 252 is in fluid communication at a downstream end with at least one second melt channel 254 having an axis 255. In the embodiment of FIG. 2, longitudinal axis CL of first melt channel 252 and axis 255 of the second melt channel 254 are substantially normal with respect to each other. For example, substantially normal can mean they are 90°±10°. In another example, another range is possible based on tolerances within desired applications. However in the embodiment of FIG. 2A, the axis CL of first melt channel 252 and the axis 255' of each of second melt channels 254' are at an acute angle with respect to each other.

A valve pin alignment bore 264 of nozzle liner 240 is sized to slidingly receive valve pin 235, but not the melt from first melt channel 252. Second melt channel 254 is in fluid communication with an annular melt channel 256 formed between nozzle liner 240 and retaining device 242. Annular melt channel 256 includes a first portion 258 and a second portion 260.

Second melt channel 254 is a release or exit channel through which the molten material flows from first melt channel 252 of nozzle liner 240. Second melt channel 254 can be formed as a bore or hole through a wall of nozzle liner 240. Depending on an application and/or material make-up of nozzle liner 240, there can be any number of release melt channels 254.

In the embodiment shown in FIG. 2, release melt channel 254 of nozzle liner 240 is used to transmit the molten material to first portion 258 of annular melt channel 256, which in this embodiment acts as a decompression chamber. A pressure of the molten material is greater in release melt channel 254 than in decompression chamber 258. From decompression chamber 258, the molten material flows into second portion 260, which acts as a compression chamber. A pressure of the molten material in decompression chamber 258 is reduced due to the material expansion allowed within decompression chamber 258. From decompression chamber 258, the molten material flows into second portion or compression chamber 260 of annular melt channel 256, which due to the restrictive configuration of second portion 260 increases a pressure of the molten material as the molten material is forced therethrough toward a mold gate 228 of a mold cavity 226. As can be appreciated from FIG. 2, the decompression chamber 258 circumferentially surrounds the portion of the nozzle liner 240 through which release melt channels 254 extend such that release melt channels 254 radially discharge into the circumferential decompression chamber 258. Additionally, the circumference/diameter of the nozzle liner may be smaller in the area of decompression chamber 258 than the circumference/diameter of the nozzle liner in the area of compression chamber 260, such that cross-sectional flow area through the decompression chamber 258 is greater than that of the more restrictive compression chamber 260. This arrangement of annular melt channel 256 balances the flow velocity and pressure of the melt exiting nozzle body melt channel 216 resulting in balanced melt flow between mold cavities 226, which in turn provides consistent part quality between parts produced in different mold cavities.

In accordance with embodiments of the present invention, nozzle liner 240 serves two purposes. As described above, nozzle liner 244 controls the melt flow by distributing the molten material from first melt channel 252 through release melt channels 254, such that the flow, velocity, and/or pressure is balanced resulting in an even and balanced flow of the molten material. Nozzle liner 240 also functions as an alignment device for valve pin 235. As such, nozzle liner 240 includes valve pin alignment bore 264 that slidingly aligns valve pin 235 with gate 228 in close proximity thereto to avoid any deflection during pin closing and pressure against movement. In an embodiment, an inside surface of bore 264 can be coated with a coating that aides in the movement (friction) and/or alignment of valve pin 235. The coating can be, but is not limited to, a nickel-based material, or the like. A coating can also be implemented to improve the hardness of the nozzle liner 240 surface in contact with the valve pin 235. A fit between valve pin 235 and nozzle liner bore 264 does not allow melt to flow around valve pin 235.

In this embodiment, due to the "flushing" nature of the melt flow through nozzle liner 240 of nozzle 204 there is not a conventional "bubble" area between retaining device 242, nozzle liner 240, and mold gate 228. For example, a "bubble area" can be seen as a stagnant area between retaining device 242, tip 240, and mold gate 228 that fills with material during a first shot. The material remains stagnant and typically does not flush out between shots. In an embodiment, the stagnant material can be used to provide insulation between nozzle liner 240 and mold plate 106. Respective pressure changes in the melt between second melt channel 254 and first and second portions 258 and 260 of annular melt channel 256 causes the molten material to flow between first melt channel 252 and mold cavity 226 at a higher sheer rate than in conventional nozzles, thereby mixing and maintaining melt in a molten condition to readily exit via mold gate 228. In an embodiment, this allows a better consistency of molten material due to mixing before mold cavity 226, thereby reducing or eliminating weld/flow lines within the molded product. In another embodiment during color change, the afore-mentioned configuration allows the previous color molten material to be flushed out of nozzle 204 substantially within very few product cycles, e.g. in approximately ¼-⅕ the number of cycles required using a conventional nozzle arrangement complete color change may be achieved.

Figure 9:
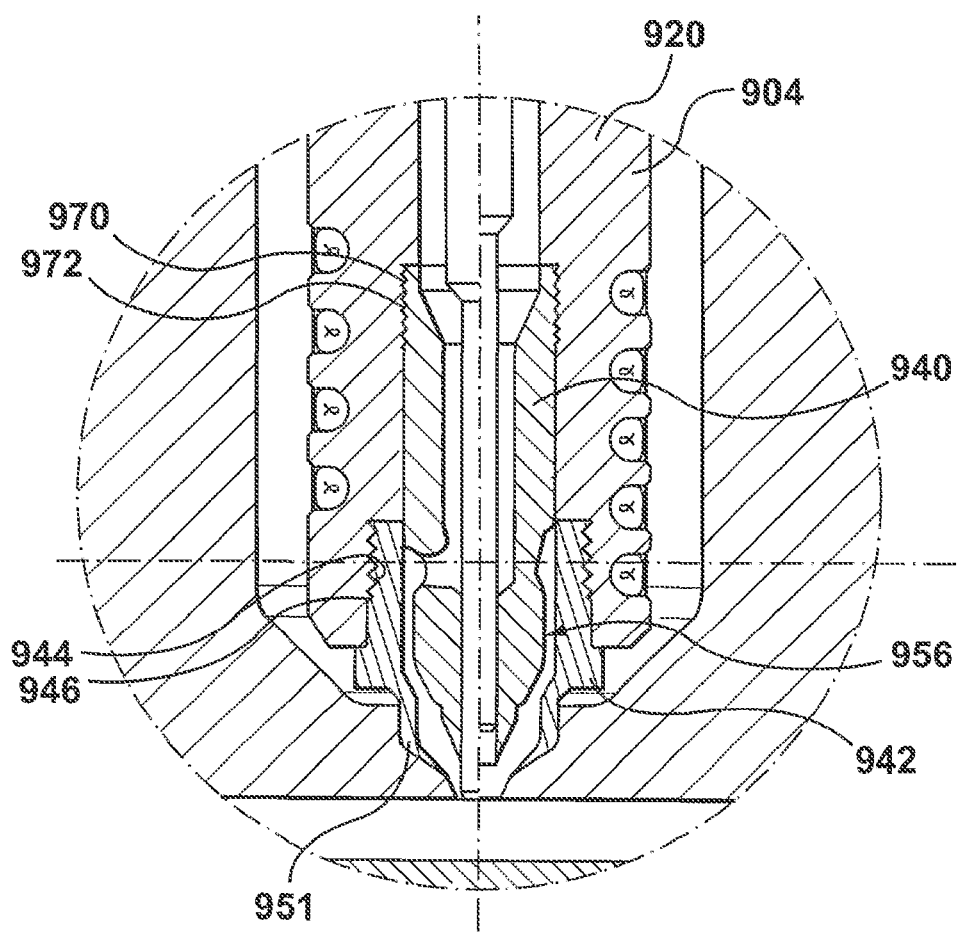
FIG. 9 illustrates a sectional view of a valve-gated nozzle arrangement according to another embodiment of the present invention.

FIG. 9 illustrates a sectional view of a portion of a valve-gated nozzle 904 in accordance with another embodiment of the present invention. Many elements shown in FIG. 9 are similar to those shown and described with reference to FIG. 2, as such only the differences in structure will be discussed below. Unlike the embodiment of FIG. 2, nozzle liner 940 is retained within nozzle 904 through the threaded engagement between threads 970 formed on nozzle liner 940 and threads 972 formed on an inner surface of a front end bore of nozzle body 920. Transfer seal 942 is also secured within the front end bore of nozzle body 920 through threaded engagement between threads on outer wall 944 of retaining device 942 with complementary threads on inner wall 946 of nozzle body 920. Although transfer seal 942 does not retain nozzle liner 940 within nozzle body 920, it still functions similarly to retaining device 242 by providing a sealing portion 951 as well as defining an outer surface of annular melt channel 956. In alternate embodiments, nozzle liner and/or retaining device 940, 942 may be coupled to nozzle body 920 via brazing or another coupling method known to one of ordinary skill in the art.

Figure 3:
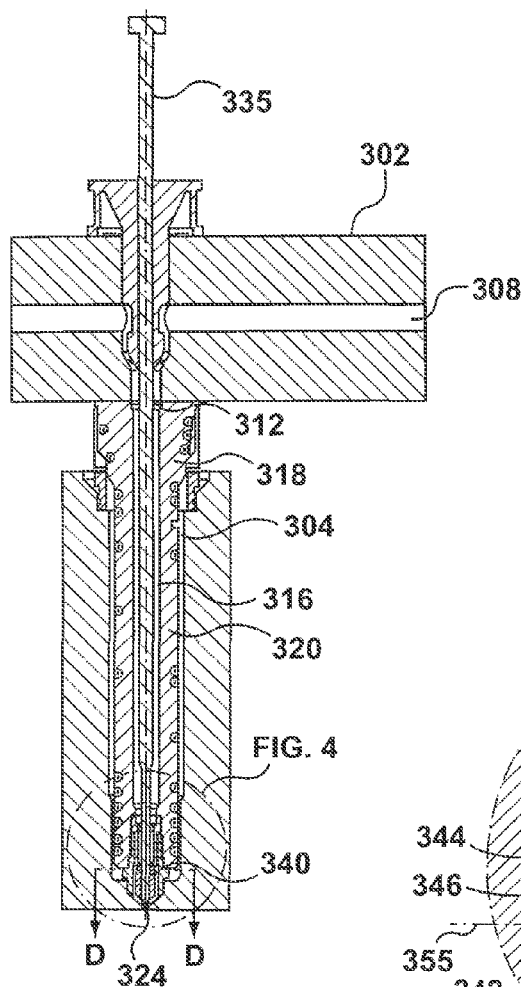
FIG. 3 illustrates a side sectional view of a valve-gated nozzle arrangement according to another embodiment of the present invention.
Figure 4:
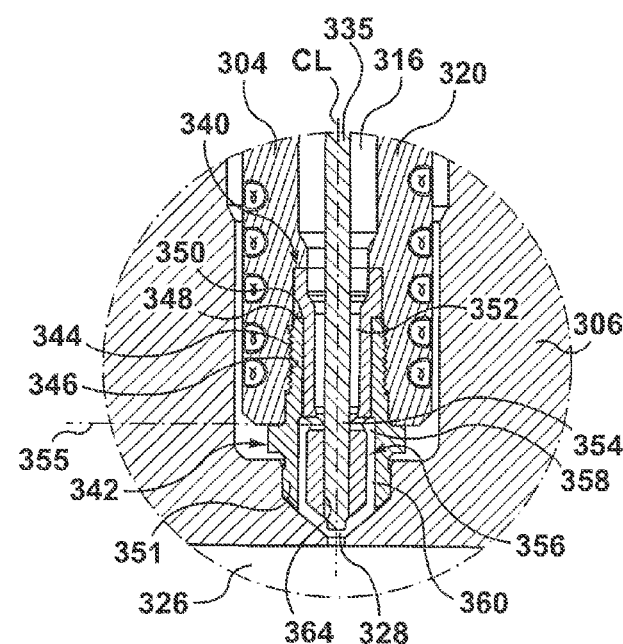
FIG. 4 is an enlarged view of a portion of the nozzle in FIG. 3.
Figure 5:
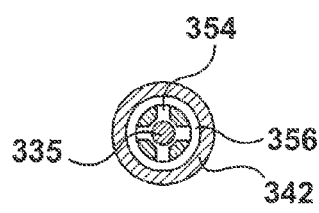
FIG. 5 illustrates a cross-sectional view of the nozzle liner and retainer of the nozzle of FIG. 3 taken along line D-D.

FIGS. 3-5 illustrate a valve-gated nozzle 304 for use in the injection molding apparatus of FIG. 1 according to another embodiment of the present invention. FIG. 4 is an enlarged view of a portion of nozzle 304 in FIG. 3. In this embodiment, valve-gated nozzle 304 includes a nozzle liner 340 and retaining device 342, which may function as a two-piece nozzle seal. Retaining device 342 positions and secures nozzle liner 340 within nozzle body 320 through threaded engagement between threads on an outer wall 344 of retaining device 342 with complementary threads on an inner wall 346 of nozzle body 320, such that a shoulder 348 of retaining device 342 abuts a curved portion 350 of nozzle liner 340. Retaining device 342 includes a sealing portion 351 that provides a seal against mold plate 306 proximate mold gate 328 to prevent melt leakage.

Nozzle liner 340 includes a first melt channel 352 having a longitudinal axis CL that is in fluid communication at an upstream end with a nozzle body melt channel 316. As shown in FIG. 5, which is a cross-sectional view of nozzle liner 340 taken along line D-D in FIG. 3, first melt channel 352 is in fluid communication at a downstream end with four second melt channels 354, two of which share a longitudinal axis 355 that is substantially normal with respect to axis CL of first melt channel 352. The remaining second melt channels 354 may have longitudinal axes 355 that are substantially normal to or at an acute angle with respect to axis CL. In alternate embodiments, one or more second melt channels may have an axis 355 that is normal to or at an acute angle with CL. In alternate embodiments, a number of release melt channels is application specific, as are the parameters (sizes) of the release melt channels and the decompression chamber and compression chamber of the annular melt channel.

Nozzle liner 340 also includes a valve pin alignment bore 364 sized to slidingly receive a valve pin 335, but not the melt, from first melt channel 352. Second melt channels 354 are in fluid communication with an annular melt channel 356 formed between nozzle liner 340 and retaining device 342. Annular melt channel 356 includes a first portion 358 and a second portion 360 that operate in the manner described above with reference to the embodiment of FIG. 2. As such, nozzle liner 340 and retaining device 342 also provide the melt balancing/mixing benefit described above.

Nozzle liner 340 distributes the molten material from first melt channel 352 through release melt channels 354, such that the flow, velocity, and/or pressure is balanced. In addition, nozzle liner 340 also functions as an alignment device for valve pin 335. As such, nozzle liner 340 includes valve pin alignment bore 364 that slidingly aligns valve pin 335 with gate 328 in close proximity thereto to avoid any deflection during pin closing and pressure against movement. Valve pin 335 is shown in an open position in FIG. 4. In an embodiment, an inside surface of bore 364 may be coated with a coating that aides in the movement and/or alignment of valve pin 335, such as a coating of a nickel-based material, or the like.

In operation, melt channel 316 of valve-gated nozzle 304 receives a melt from manifold melt channel 308 of manifold 302 via manifold outlet 312 that abut nozzle head portion 318. The melt flows through nozzle liner first and second melt channels 352, 354 into and through annular melt channel 356, as described above, to be delivered via nozzle outlet 324 through mold gate 328 into mold cavity 326.

Figure 7:
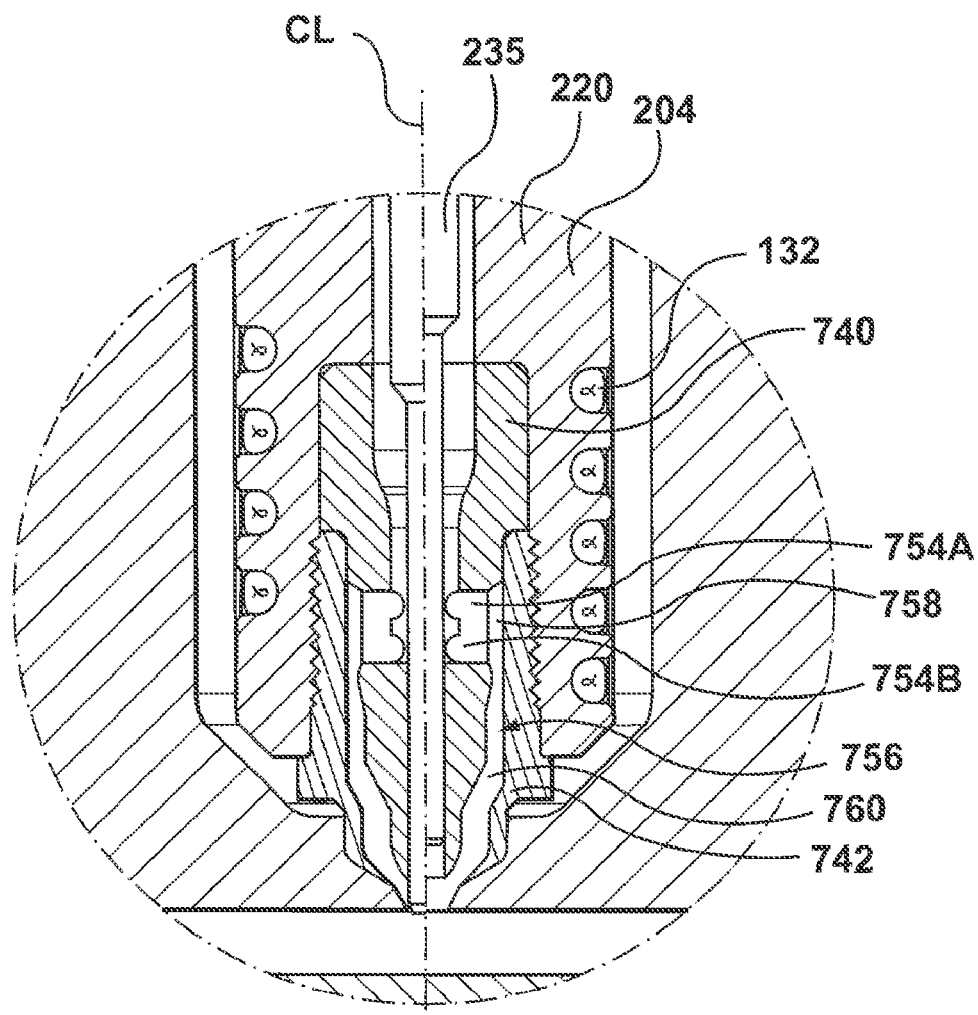
FIG. 7 illustrates a sectional view of a valve-gated nozzle arrangement according to another embodiment of the present invention.
Figure 8:
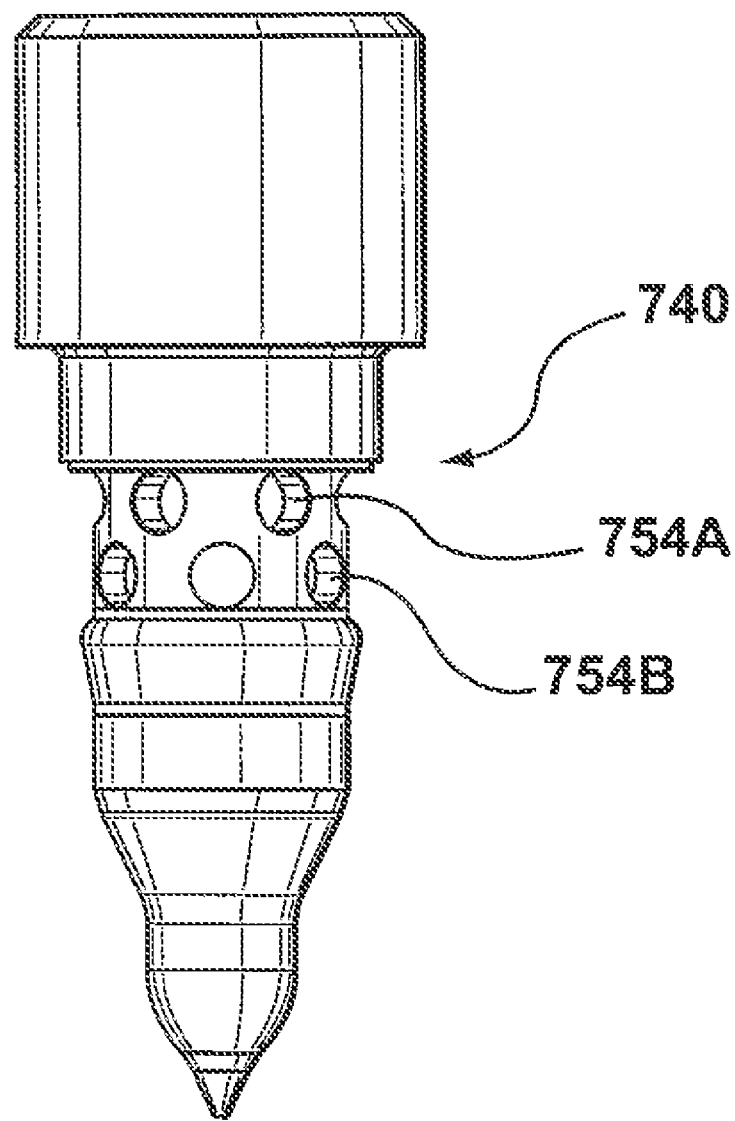
FIG. 8 illustrates a side view of a nozzle liner 740 of FIG. 7.

FIG. 7 illustrates a sectional view of a portion of a valve-gated nozzle 704 according to another embodiment of the present invention. FIG. 8 illustrates a side view of a nozzle liner 740 of FIG. 7. Nozzle liner 740 has a plurality of release melt channels 754A on a first level and a second plurality of release melt channels 754B on a second level downstream from a first level. In an embodiment, release melt channels 754A are offset with respect to release melt channels 754B, which may be done, for example, to provide an intercrossing melt flow that may result in a substantial reduction of weld/split lines as compared to only a single release melt channel or a single level release melt channel embodiment. In alternate embodiments, a number of release melt channels 754A on the first level can be equal to or different than a number of release channels 754B on the second level.

FIG. 7 includes all elements described above for FIGS. 2 and 4, with the alternative nozzle liner 740, as described above for FIG. 7. In the example shown in FIG. 7, release melt channels 754A and 754B exit from first melt channel 752 into first portion 758 of annular melt channel 756.

Figure 6:
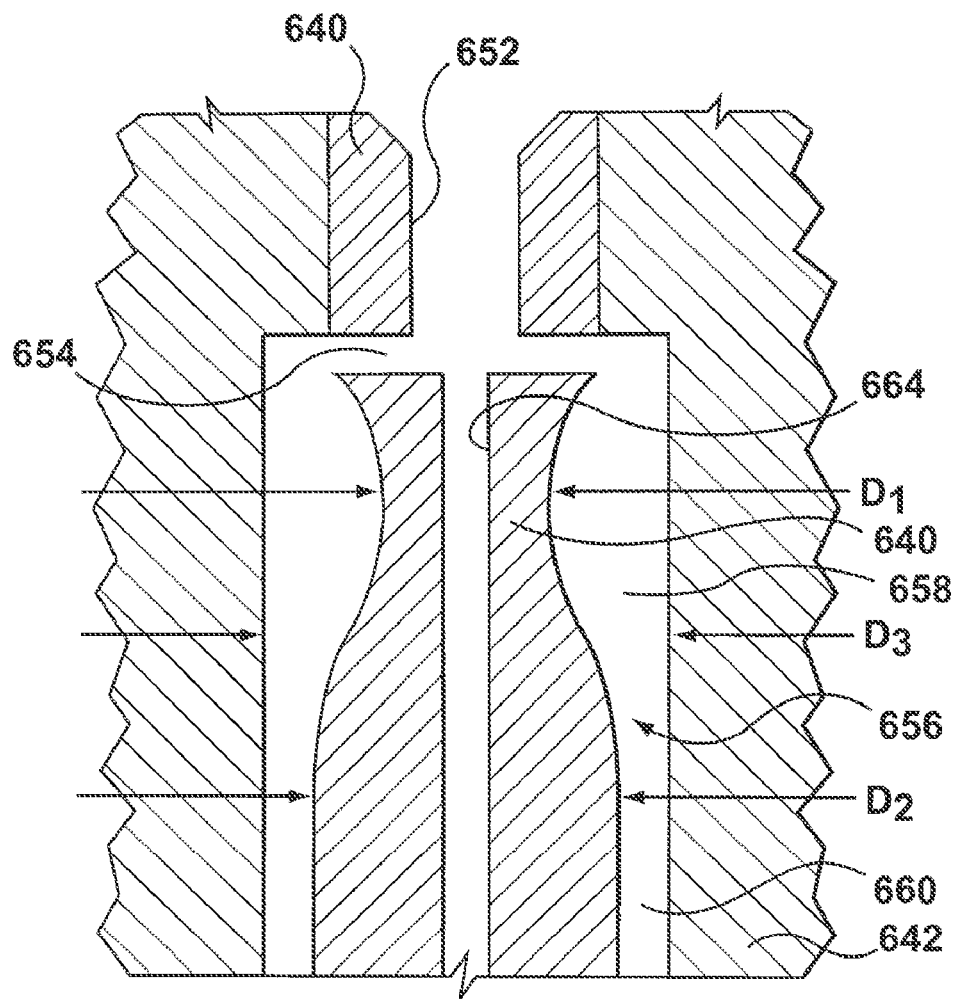
FIG. 6 is a schematic sectional view of a portion of a nozzle liner and retaining device according to another embodiment of the present invention.

FIG. 6 is a schematic sectional view of a portion of a nozzle liner 640 and retaining device 642 according to an embodiment of the present invention. Nozzle liner 640 includes a first melt channel 652 that feeds a melt stream into a plurality of second melt channels 654, which in turn transfer the melt stream into an annular melt channel 656 that is defined between a nozzle liner 640 and a retaining device 642. Annular melt channel 656 includes a first inner diameter D1 formed in a first portion 658 of annular melt channel 656 and a second inner diameter D2 formed in a second portion 660 of annular melt channel 656, wherein D1 is smaller than D2. In this embodiment, an outer diameter D3 of annular melt channel 656 is constant along the length of annular melt channel 656, such that within annular melt channel 656 an annular area of first portion 658 is greater than an annular area of second portion 660. Nozzle liner 640 also includes a valve pin alignment bore 664 for aligning a valve pin (not shown) with a mold gate (not shown) in close proximity thereto, to avoid any deflection during pin closing.

In an embodiment, the retaining device has a substantially constant inner diameter. The annular melt channel includes a first portion and a second portion. The first portion of the annular channel has a first inner diameter and is in fluid communication with the nozzle liner second melt channel. The second portion of the annular melt channel has a second inner diameter and is in fluid communication with the first portion of the annular melt channel and with a mold cavity. The second inner diameter is larger than the first inner diameter.

Figure 10:
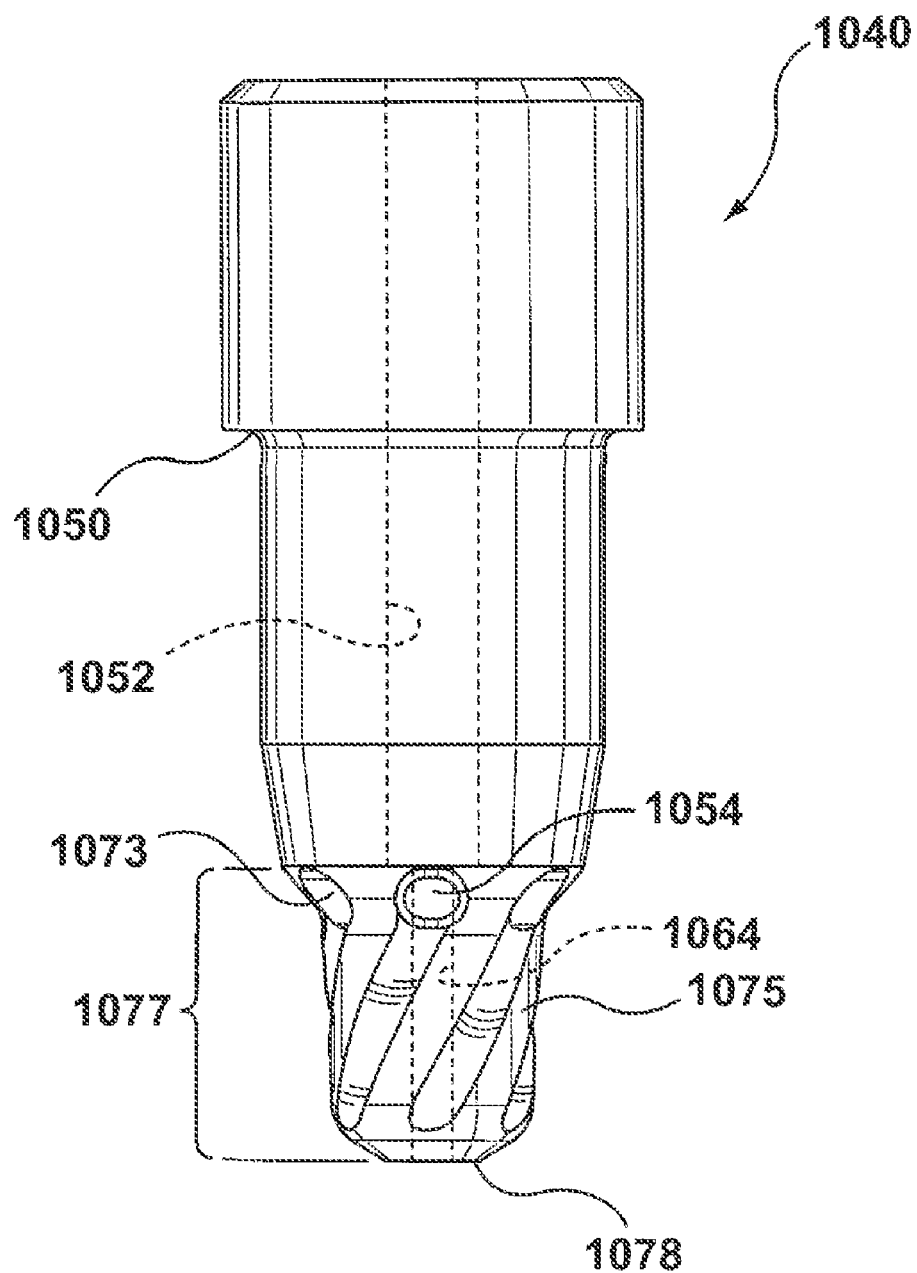
FIG. 10 illustrates a side view of a nozzle liner 1040 according to another embodiment of the present invention.
Figure 12:
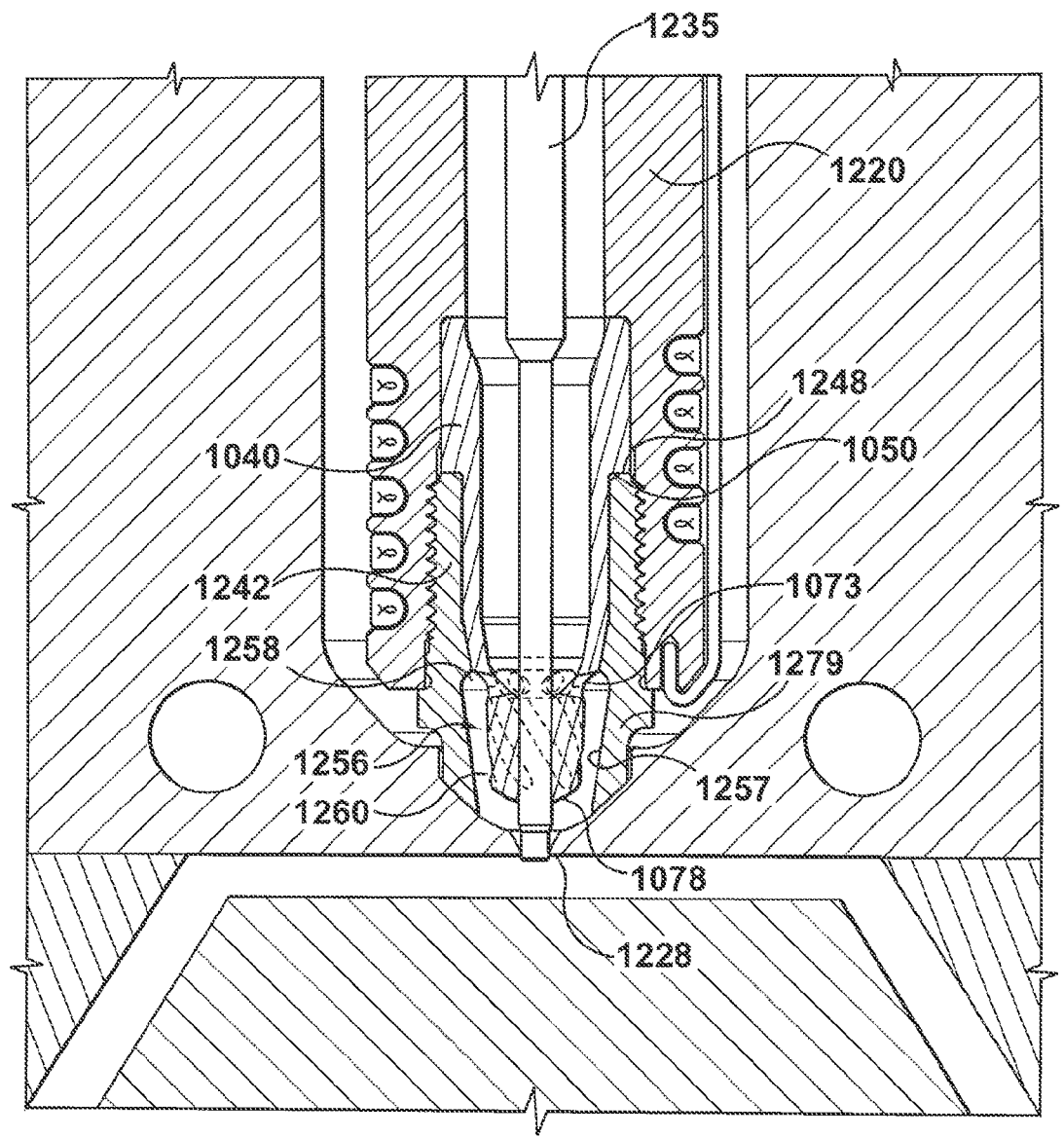
FIG. 12 illustrates a side sectional view of a portion A of FIG. 1 according to another embodiment of the present invention that includes the nozzle liner of FIG. 10.

FIG. 10 illustrates a side view of a nozzle liner 1040 according to another embodiment of the present invention and FIG. 12 illustrates a side sectional view of a portion A of FIG. 1 that includes nozzle liner 1040 of FIG. 10. Nozzle liner 1040 includes a centrally located first melt channel 1052 for directing a melt stream to a plurality of second or release melt channels 1054. As in the previously described embodiments, a longitudinal axis of first melt channel 1052 and a longitudinal axis of second or release melt channel(s) 1054 may be at an acute angle with respect to each other or substantially normal, i.e., 90°±10°, with respect to each other.

Nozzle liner 1040 also includes a valve pin alignment bore 1064 for aligning a valve pin 1235 with a mold gate 1228, as discussed above with reference to the previous embodiments. Nozzle liner 1040 includes a curved portion 1050 that allows nozzle liner 1040 to be secured by a shoulder 1248 of a retaining device 1242 within a nozzle body 1220. In the embodiment depicted in FIG. 12, retaining device 1242 is threadably engaged with nozzle body 1220.

An outer surface of a downstream portion 1077 of nozzle liner 1040 provides an inner surface for an annular melt channel 1256 according to another embodiment of the present invention. The outer surface of annular melt channel 1256 is provided by a tapered inner surface 1257 of a downstream portion 1279 of retaining device 1242.

Nozzle liner downstream portion 1077 extends from proximate a recessed outlet 1073 of release channels 1054 to a downstream end 1078 of nozzle liner 1040 and includes one or more groove(s) 1075 in the outer surface thereof. An upstream end of groove 1075 is adjacent to outlet 1073 of release melt channel 1054 to receive the melt stream therefrom, such that the melt stream is directed along groove 1075 within downstream portion 1077 of nozzle liner 1040. In the embodiment of FIG. 10, grooves 1075 partially curve or spiral around downstream portion 1077 of nozzle liner 1040. In other embodiments, groove or grooves 1075 may run parallel to or at an acute angle with a longitudinal axis of nozzle liner 1040 within downstream portion 1077. In various other embodiments, two or more grooves 1075 may cross or extend in opposite directions from each other within downstream portion 1077. Accordingly, groove(s) 1075 aid in guiding, swirling and/or mixing the melt stream emanating from release channel(s) 1054 within annular melt channel 1256 to provide a better consistency to the melt stream before it enters the mold cavity, thereby reducing or eliminating weld/flow lines within the molded product.

In another embodiment, release melt channel 1054 of nozzle liner 1040 is used to transmit the molten material to a first portion 1258 of annular melt channel 1256 that acts as a decompression chamber due its enlarged annular area. A pressure of the molten material is greater in release melt channel 1054 than in decompression chamber 1258, as a pressure of the molten material in decompression chamber 1258 is reduced due to the material expansion allowed within the enlarged annular area. From decompression chamber 1258, the molten material flows directed by grooves 1075 into a second portion 1260 that acts as a compression chamber due to the restrictive configuration of second portion 1260 that increases a pressure of the molten material as it is forced there through and toward mold gate 1228.

Figure 11:
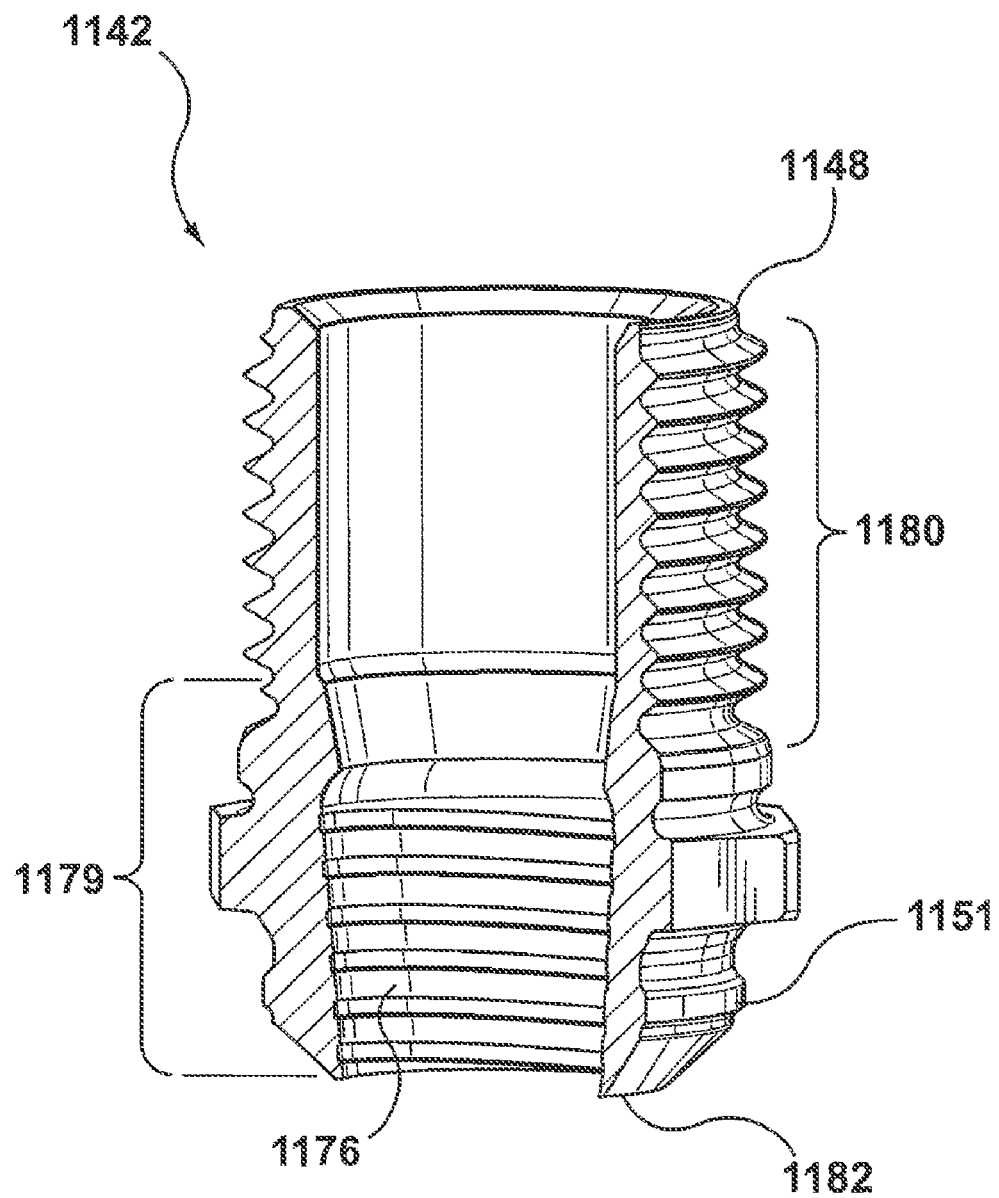
FIG. 11 illustrates a side view in partial section of a tip retainer 1142 according to another embodiment of the present invention.

FIG. 11 illustrates a side view in partial section of a retaining device 1042 according to another embodiment of the present invention. An upper end or shoulder 1148 of retaining device 1142 is for engaging a curved portion of a nozzle liner, such as curved portion 250, 1050 of nozzle liners 240, 1040 of the embodiments shown in FIGS. 2 and 10, respectively, which in conjunction with threaded portion 1180 secures the nozzle liner to a nozzle body. Retaining device 1142 includes a sealing portion 1151 for sealing against a mold plate proximate a mold gate during operation of the injection molding system.

An inner surface of a downstream portion 1179 of retaining device 1142 provides an outer surface for an annular melt channel according to another embodiment of the present invention. The inner surface of the annular melt channel is provided by an outer surface of a downstream portion of a retaining device, such as retaining device 242, 1042 of FIGS. 2 and 10, respectively, as discussed above with reference to the previous embodiments.

Retaining device downstream portion 1179 extends from proximate an outlet of a release channel (not shown) to an end 1182 of retaining device 1142 and includes one or more grooves 1176 in the inner surface thereof. An upstream end of groove 1176 is for positioning proximate an outlet of a release melt channel to receive the melt stream therefrom, such that the melt stream is directed along groove 1176 within downstream portion 1179 of retaining device 1142. Accordingly, groove(s) 1176 aids in guiding, swirling and/or mixing the melt stream emanating from the release channel(s) of the nozzle liner within the annular melt channel to provide a better consistency to the melt stream before it enters a mold cavity, thereby reducing or eliminating weld/flow lines within the molded product.

In the embodiment of FIG. 11, grooves 1176 partially curve or spiral within downstream portion 1179 of retaining device 1142. In other embodiments, groove or grooves 1176 may run parallel to or at an acute angle with a longitudinal axis of retaining device 1142 within downstream portion 1179. In various other embodiments, two or more grooves 1176 may cross or extend in opposite directions from each other within downstream portion 1179.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A valve-gated nozzle for an injection molding apparatus, comprising:
    a nozzle body having a nozzle melt channel;
    a nozzle liner, including,
        a first melt channel in fluid communication with the nozzle melt channel, the first melt channel having a first melt channel axis, and
        two or more second melt channels in fluid communication with the first melt channel, each second melt channel having a second melt channel axis that is at an angle with respect to the first melt channel axis, and
        a downstream portion extending from proximate the outlets of the second melt channels to a downstream end of the nozzle liner;
    a retaining device that secures the nozzle liner with respect to the nozzle body and includes a downstream portion with an inner surface;
    an annular melt channel formed between the outer surface of the nozzle liner downstream portion and the inner surface of the retaining device downstream portion, wherein within the annular melt channel at least one of the outer surface of the nozzle liner downstream portion and the inner surface of the retaining device downstream portion includes a groove; and
    a valve pin slidingly extending within the nozzle melt channel and the first melt channel of the nozzle liner to selectively open a mold gate, wherein the downstream portion of the nozzle liner includes a valve pin alignment bore for aligning the valve pin with the mold gate.

2. The nozzle of claim 1, wherein the groove is in the outer surface of the downstream portion of the nozzle liner and extends from at least one of the second melt channel outlets to a downstream end of the nozzle liner.

3. The nozzle of claim 2, wherein there are two or more nozzle liner second melt channels and a corresponding number of grooves, such that the outlet of each second melt channel is in communication with a respective groove.

4. The nozzle of claim 1, wherein the groove is in the inner surface of the downstream portion of the retaining device and extends from proximate the outlet of the second melt channel to a downstream end of the retaining device.

5. The nozzle of claim 4, wherein there are two or more nozzle liner second melt channels and a corresponding number of grooves, such that the outlet of each second melt channel is in communication with a respective groove.

6. The nozzle of claim 1, wherein the retaining device further includes a retaining portion that positions the nozzle liner with respect to the nozzle body and a mold plate contacting portion that contacts the mold gate.

7. The nozzle of claim 6, wherein the retaining device is more insulative than the nozzle liner.

8. The nozzle of claim 6, wherein the retaining device is the same or more thermally conductive than the nozzle liner.

9. The nozzle of claim 1, wherein the second melt channel axis is substantially normal with respect to the first melt channel axis.

10. A valve-gated nozzle for an injection molding apparatus, comprising:
    a nozzle body having a nozzle melt channel;
    a nozzle liner, including,
        a first melt channel in fluid communication with the nozzle melt channel, and having a first melt channel axis,
        two or more second melt channels in fluid communication with the first melt channel, wherein each of the second melt channels has a second melt channel axis that is at an angle with respect to the first melt channel axis, and
        a downstream portion that includes an outer surface;
    a transfer seal secured to the nozzle body and having a downstream portion that includes an inner surface extending around the outer surface of the downstream portion of the nozzle liner;
    an annular melt channel in fluid communication with the outlets of the second melt channel and being defined by the outer surface of the downstream portion of the nozzle liner and the inner surface of the downstream portion of the transfer seal, such that melt flows through the annular melt channel before entering a mold cavity, wherein within the annular melt channel at least one of the outer surface of the nozzle liner downstream portion and the inner surface of the transfer seal downstream portion includes a groove; and a valve pin slidingly extending within the nozzle melt channel and the first melt channel of the nozzle liner to selectively open a mold gate, wherein the downstream portion of the nozzle liner includes a valve pin alignment bore for aligning the valve pin with the mold gate.

11. The nozzle of claim 10, wherein the transfer seal further includes a retaining portion that positions and secures the nozzle liner with respect to the nozzle body.

12. The nozzle of claim 10, wherein the groove is in the outer surface of the downstream portion of the nozzle liner and extends from at least one of the second melt channel outlets to a downstream end of the nozzle liner.

13. The nozzle of claim 12, wherein there are two or more nozzle liner second melt channels and a corresponding number of grooves, such that the outlet of each second melt channel is in communication with a respective groove.

14. The nozzle of claim 10, wherein the groove is in the inner surface of the downstream portion of the transfer seal and extends from proximate the outlet of the second melt channel to a downstream end of the transfer seal.

15. The nozzle of claim 14, wherein there are two or more nozzle liner second melt channels and a corresponding number of grooves, such that the outlet of each second melt channel is in communication with a respective groove.

16. The nozzle of claim 10, further comprising:
a mold contacting piece for positioning between the transfer seal and a mold plate proximate the mold gate, wherein the mold contacting piece is of a material that is less thermally conductive than a material of the transfer seal.

17. The nozzle of claim 10, wherein each of the outer surface of the downstream portion of the nozzle liner and the inner surface of the downstream portion of the transfer seal includes a groove.

18. The nozzle of claim 17, wherein an upstream end of each of the grooves is in fluid communication with an outlet of the second melt channel.

19. The nozzle of claim 10, wherein the second melt channel axis is substantially normal with respect to the first melt channel axis.

20. The nozzle of claim 1, wherein each of the outer surface of the nozzle liner and the inner surface of the retaining device includes a groove.

21. The nozzle of claim 1, further comprising:
a mold contacting piece for positioning between the retaining device and a mold plate proximate the mold gate.

22. The nozzle of claim 21, wherein the mold contacting piece is of a material that is less thermally conductive than a material of the retaining device.

23. The nozzle of claim 1, wherein the groove spirals around the outer surface of the nozzle liner downstream portion.

24. The nozzle of claim 23, wherein the spiral groove extends from at least one of the second melt channel outlets to the downstream end of the nozzle liner.

25. The nozzle of claim 1, wherein the groove runs parallel to the first melt channel axis of the nozzle liner.

26. The nozzle of claim 25, wherein the groove extends from at least one of the second melt channel outlets to the downstream end of the nozzle liner.

27. The nozzle of claim 1, wherein the groove partially curves around the outer surface of the nozzle liner downstream portion at an acute angle to the first melt channel axis of the nozzle liner.

28. The nozzle of claim 27, wherein the groove extends from at least one of the second melt channel outlets to the downstream end of the nozzle liner.

29. The nozzle of claim 3, wherein each groove partially curves around the outer surface of the nozzle liner downstream portion at an acute angle to the first melt channel axis of the nozzle liner.

30. The nozzle of claim 3, wherein at least two grooves curve around the outer surface of the nozzle liner downstream portion in opposite directions from each other.

31. The nozzle of claim 1, wherein the groove spirals around the inner surface of the transfer seal downstream portion.

32. The nozzle of claim 1, wherein the groove partially curves around the inner surface of the transfer seal downstream portion at an acute angle to the first melt channel axis of the nozzle liner.

* * * * *